United States Patent [19]

Meckstroth

[11] 3,955,791

[45] *May 11, 1976

[54] PILOT OPERATED FLUID CONTROL VALVE

[76] Inventor: Alan F. Meckstroth, 2357 Shelterwood Drive, Dayton, Ohio 45409

[ * ] Notice: The portion of the term of this patent subsequent to Mar. 25, 1992, has been disclaimed.

[22] Filed: May 20, 1974

[21] Appl. No.: 471,290

Related U.S. Application Data

[63] Continuation-in-part of Ser. No. 324,506, Jan. 17, 1973, Pat. No. 3,873,059.

[52] U.S. Cl.................................. 251/11; 251/38; 251/45; 251/75; 137/270; 137/360; 236/81
[51] Int. Cl.² ...................... F16K 31/02; F03G 7/06
[58] Field of Search .................. 251/11, 38, 75, 45; 137/270, 360; 236/81, 80 F

[56] References Cited
UNITED STATES PATENTS

| | | | |
|---|---|---|---|
| 1,058,874 | 4/1913 | Larson | 236/81 |
| 2,211,301 | 7/1940 | Taylor | 236/80 F |
| 2,960,303 | 11/1960 | Smallpiece | 251/11 |
| 3,024,811 | 3/1962 | McKinley | 251/11 X |
| 3,643,913 | 2/1972 | McIntosh | 251/11 |
| 3,745,984 | 7/1973 | King | 251/11 X |

*Primary Examiner*—Arnold Rosenthal

[57] ABSTRACT

A valve body includes a base section having an inlet and an outlet and means forming a valve seat therebetween. A flexible diaphragm is supported for movement relative to the valve seat and includes a center by-pass port which is opened and closed by a valve member supported for axial movement by a closure section of the valve body. A pin-like actuating lever is pivotally supported by a flexible seal secured to the closure section and has an inner end portion projecting into an opening formed within the valve member. An elongated U-shaped bimetallic actuating element is mounted on the closure section generally parallel to the lever and includes a movable head portion. The bimetallic actuating element is preferably connected as a resistance in series with an electrical load, and a spring is compressed against the outer end of the actuating lever to cause rapid snap-action movement of the lever, and the valve member in response to slower movement of the head portion of the actuating element. In a modification, the bimetallic actuating element is located within a cup which is formed as a part of the valve body and is positioned to receive an overflow of water from a tank which is supplied with water through the valve. The valve body may be supported by an internally threaded tubular fitting having a flange with peripheral teeth for engaging a support bracket and providing for angular adjustment relative to the bracket.

13 Claims, 15 Drawing Figures

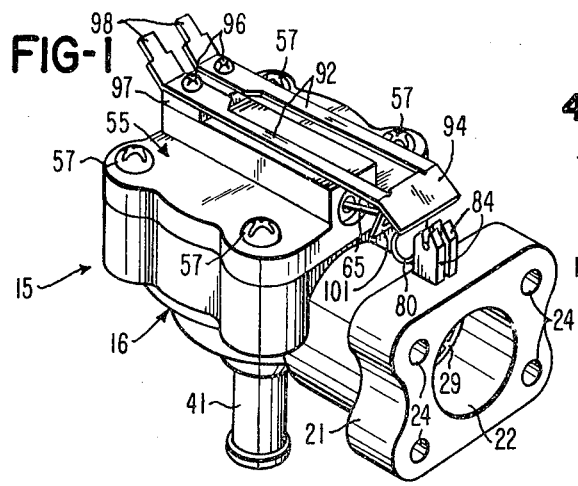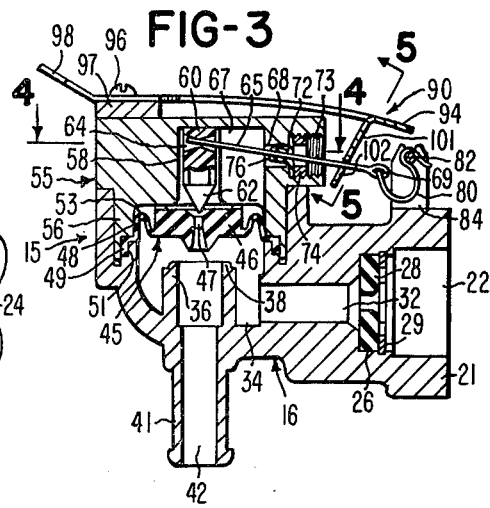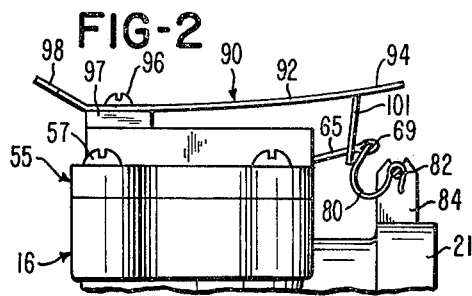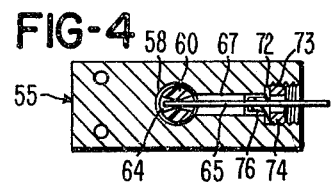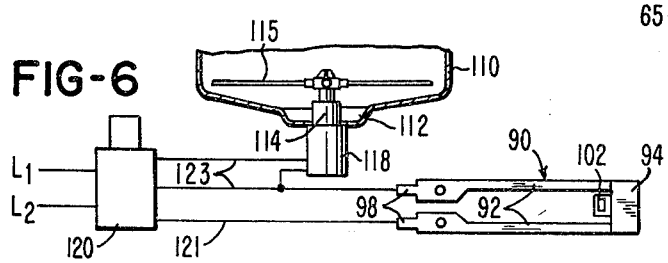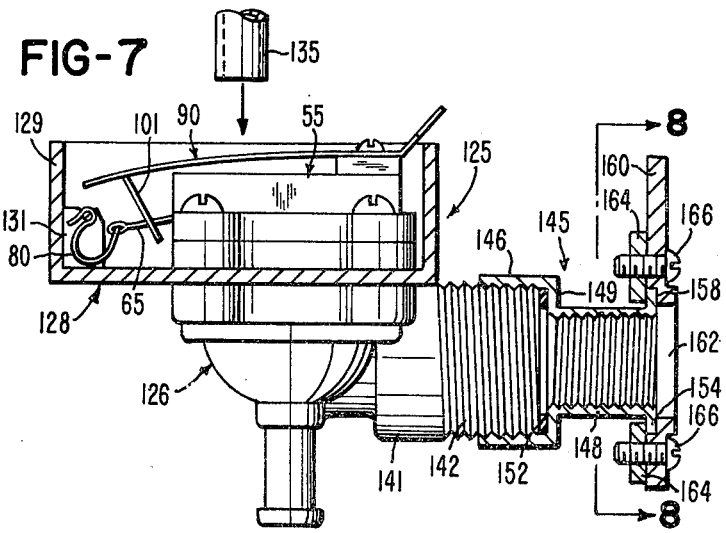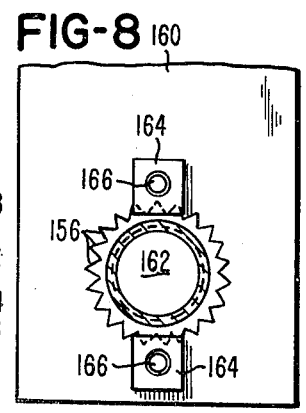

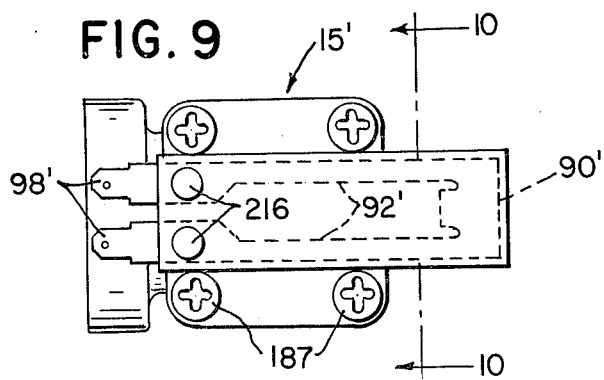
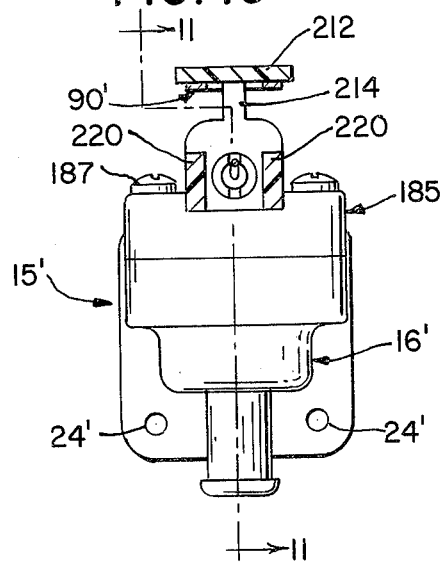
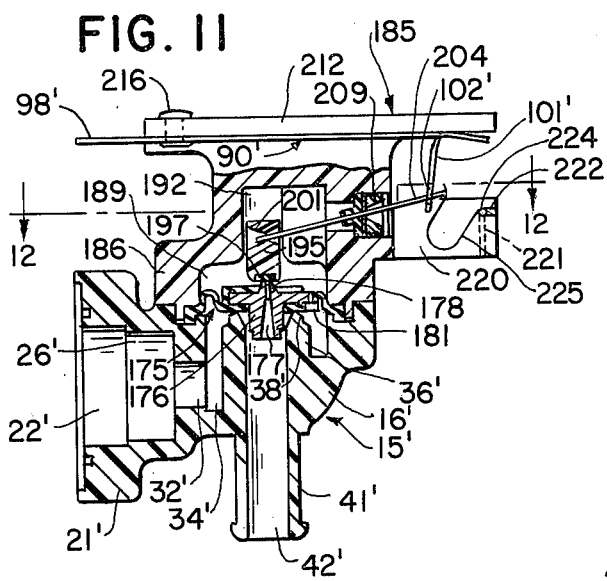
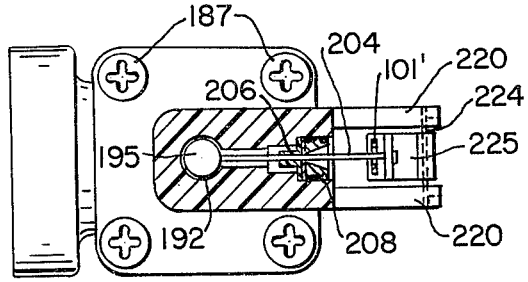
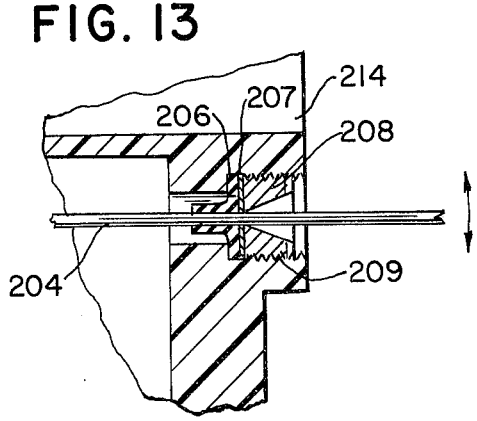
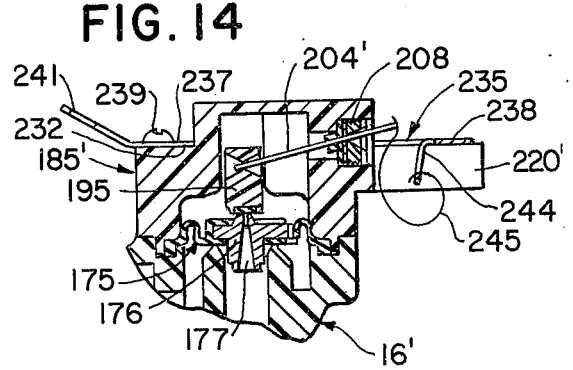
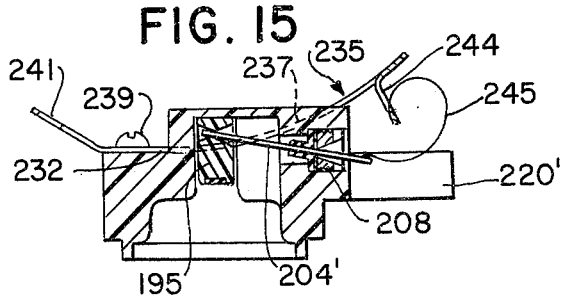

PILOT OPERATED FLUID CONTROL VALVE

RELATED APPLICATION

This application is a continuation-in-part of copending application Ser. No. 324,506, filed Jan. 17, 1973, now U.S. Pat. No. 3,873,059.

BACKGROUND OF THE INVENTION

In the field of appliances such as clothes washing and dishwashing machines, it is common to employ one or more pilot operated water supply or fill valves which are actuated by one or more electrical solenoids. For example, dual inlet solenoid actuated control valves of the general type disclosed in U.S. Pat. No. 2,708,092, are used in automatic clothes washing machines, and single inlet solenoid actuated fill valves of the general type disclosed in U.S. Pat. No. 3,396,848, are commonly used in automatic dishwashing machines. The construction and operation of this particular form of solenoid operated water inlet or fill valve is well known in the art and does not require further discussion.

It has been determined that the solenoid actuator on such a pilot operated valve, produces an undesirable magnetic attraction of microscopic ferrous particles within the water supply, and an accumulation of these particles either on the spring biased metal armature or on the tube supporting the armature, sometimes causes sticking of the armature and prevents proper operation of the valve. In addition, the construction of the solenoid and the magnetically attractable armature and its enclosure add significantly to the cost of the valve.

In the construction of gas fuel control valves, it is known to provide for direct actuation of the valve member with the use of a bimetallic element surrounded by an electrical heating coil. For example, U.S. Pat. Nos. 3,346,231 and 3,513,880 each disclose such a valve construction. It has also been proposed to employ similar bimetallic elements and surrounding electrical heating coils in a pilot operated diaphragm valve such as the modulating valve disclosed in U.S. Pat. No. 3,643,913. In this valve structure, a set of bimetallic blades are alternately heated and cooled in response to the temperature of the fluid flowing through the valve for modulating the flow by the pilot operated flexible diaphragm.

SUMMARY OF THE INVENTION

The present invention is directed to an improved pilot operated valve which is of simplified construction and is ideally suited for use in appliances such as a clothes washing and dishwashing machines to control the water supplied to the wash tank. However, it is to be understood that a valve constructed in accordance with the invention may be used in any other type of device wherein it is desired to provide an electrical control of the on-off flow of a fluid within the device.

In one embodiment of the invention, the conventional solenoid actuator is replaced by a U-shaped bimetallic actuating element which is adapted to be connected as a resistance in series with an electrical load such as a motor or heating element. The bimetallic actuating element includes generally parallel leg portions which are secured to a closure section of the valve body and are integrally connected by a head portion including a projecting tab having an aperture. A small diameter pin-like actuating lever is pivotally supported by a flexible annular seal and has an inner end portion projecting into a hole formed within the valve member which controls the flow of fluid through the center by-pass port of the pressure actuated diaphragm. The outer end portion of the lever projects through the aperture within the tab of the bimetallic actuating element and is engaged by a compression spring. The spring is arranged to produce an overcenter toggle action of the lever in response to movement of the bimetallic actuating element between a normal generally flat position and a curved heated position.

In a modification, the valve body includes a cup-like portion which defines a chamber for receiving the bimetallic actuating element. The valve is positioned so that the chamber receives the initial overflow of water from a tank which is supplied with water through the valve. As a result, the bimetallic actuating element cools and returns the valve to its normally closed position even through the bimetallic actuating element remains electrically energized. The valve body is also adapted to be supported by a tubular metal fitting which has internally threaded tubular portions of different diameters. One end of the fitting has an outwardly projecting flange with peripherally spaced teeth to form a spline connection with a supporting bracket. The spline connection provides for angularly adjusting the position of the valve body relative to the supporting bracket. In other embodiments, the U-shaped bimetallic actuating element is protected by an adjacent wall of the cover section, and the compression spring consists of a curved leaf spring which has its outer end pivotally supported by either a projecting portion of the cover section or the head portion of the bimetallic actuating element.

Other features and advantages of the invention will be apparent from the following description, the accompanying drawings and the appended claims.

BRIEF DESCRIPTION OF THE DRAWINGS

FIG. 1 is a perspective view of a pilot operated fluid control valve constructed in accordance with the invention;

FIG. 2 is an elevational view of a portion of the valve shown in FIG. 1 and illustrating the valve in its normally closed position;

FIG. 3 is an axial section of the valve shown in FIG. 1 and illustrating the valve in its energized open position.

FIG. 4 is a section taken generally on the line 4—4 of FIG. 3;

FIG. 5 is a section taken generally on the line 5—5 of FIG. 3;

FIG. 6 is a diagrammatic illustration of a dishwashing machine incorporating a fluid control valve constructed in accordance with the invention;

FIG. 7 is an elevational view in part section of a modified form of fluid control valve constructed and supported in accordance with the invention and illustrating the valve in its open position;

FIG. 8 is a fragmentary section taken generally on the line 8—8 of FIG. 7;

FIG. 9 is a top view of a modified pilot operated fluid control valve constructed in accordance with another embodiment of the invention;

FIG. 10 is an elevational view in part section and taken generally along the line 10—10 of FIG. 9;

FIG. 11 is a section taken generally on the line 11—11 of FIG. 10;

FIG. 12 is a section taken generally on the line 12–21 of FIG. 11;

FIG. 13 is an enlarged fragmentary section of a portion shown in FIG. 11;

FIG. 14 is a fragmentary section similar to FIG. 11 and showing another valve embodiment of the invention and illustrating it in a closed position; and FIG. 15 is a section similar to FIG. 14 and illustrating the valve embodiment in an open position.

DESCRIPTION OF THE PREFERRED EMBODIMENTS

The pilot operated fluid control valve shown in FIGS. 1-3 includes a valve body 15 consisting of a base portion or section 16 which is molded of a thermoplastics material such as nylon. The base section 16 includes an inlet portion 21 which defines a cylindrical inlet chamber 22 adapted to receive a cup-shaped fine mesh screen (not shown) for filtering the fluid or water supplied to the inlet chamber 22 through a water supply line (not shown). The supply line is coupled by a fitting (not shown) to the inlet portion 21 by a support bracket (not shown) and a set of screws threaded into the holes 24 spaced outwardly of the inlet chamber 22. A counterbore 26 extends inwardly from the inlet chamber 22 and receives a rubber flow control washer 28 which automatically compensates for pressure variations in the water supplied to the inlet chamber 22. The resilient washer 28 is retained within the counterbore 26 by a C-shaped retaining ring 29.

A passage 32 extends from the flow washer 28 to a chamber 34 into which projects a tubular portion 36 defining an annular valve seat 38. The base section 16 also includes an outwardly projecting tubular portion 41 which cooperates with the tubular portion 36 to define an outlet passage 42. A resilient flexible rubber diaphragm 45 includes a hub portion 46 which is movable to engage the valve seat 38 and defines a center fluid bypass port 47. A flexible bellows-like flange portion 48 projects outwardly from the hub portion 46 and terminates with an integrally molded annular rim portion 49 which seats on an annular stepped surface 51 molded as part of the base section 16. A pair of small fluid bleed holes 53 are formed within the flange portion 48 of the diaphragm 45 and have combined area less than that of the center bypass port 47. Up to this point, the structure described is generally well known in the art of solenoid actuated fluid control valves of the type referred to above.

In accordance with the present invention, the plastic valve body 15 also includes a cap-like closure section 55 which encloses the valve chamber 34 and is also molded of a thermoplastics material such as nylon. The closure section 55 includes a downwardly projecting annular portion 56 which has a stepped end surface contoured to confine the outer rim portion 49 of the diaphragm 45 and compress it against the surface 51 to form an annular fluid-tight seal between the base section 16 and the closure section 55. The closure section is secured to the base section 16 by a set of form screws 57 (FIG. 1).

A bore 58 is formed within the center of the closure section 55 and receives a plunger-like valve member 60 which is also preferably molded of a thermoplastics material. The valve member 60 is free to slide axially within the bore 58 and includes an inner pointed tip portion 62 which is positioned to effect closing of the center bypass port 47 within the diaphragm 45. An hourglass-shaped opening or hole 64 is formed within the upper end portion of the valve member 60 and receives the inner end portion of an elongated straight pin-like actuating lever 65.

The lever 65 projects into the bore 58 through a slot 67 and a small cylindrical opening 68 which has an axis normal to that of the bore 58. The lever 65 consists of a portion of a straight stainless steel needle which has an eye 69 and a diameter of approximately 0.040 inch. The lever 65 is pivotally supported by a thin circular rubber-like seal 72 which is compressed within a concentric bore 73 by an annular screw 74. The seal 72 includes an integrally molded tubular portion 76 which forms a press fit on the pin-like lever 65 and projects inwardly into the opening 68. A U-shaped compression spring 80 has a hook-like end portion which projects into the eye 69 of the lever 65. The opposite end portion of the spring 80 is pivotally supported by a cross pin 82 which is snap-fitted into recesses formed within the upper end portions of a pair of parallel spaced ears or projections 84 molded as an integral part of the base section 16.

An elongated resistance type bimetallic actuating element 90 includes a pair of generally parallel spaced leg portions 92 integrally connected by a head portion 94 to form a generally U-shaped configuration. The leg portions 92 are rigidly secured to the closure section 55 by a pair of screws 96 which extend through a phenolic spacer pad 97. A spade-like electrical terminal 98 forms the outer end of each of the leg portions 92 and is adapted to be connected in an electrical circuit as will be explained later. As a result of the mounting of the bimetallic actuating element 90 on the closure section 55 of the valve body 15, the head portion 94 of the actuating element is cantileverly supported from the spacer pad 97. An integral tab member 101 (FIGS. 3 and 5) projects downwardly as part of the head portion 94 of the actuating element 90 and includes a rectangular aperture or hole 102 which receives the outer projecting end portion of the pin-like actuating lever 65.

A typical use of a pilot operated fluid control valve constructed in accordance with the invention, is diagrammatically illustrated in FIG. 6. This use is for an automatic dishwashing machine which includes a tank 110 having a sump portion 112 in which is positioned a main recirculating pump 114 which supports a reactionary rotary spray-on 115. The pump 114 is driven by an electrical motor 118 which commonly has a rating of between 1/3 and 1/2 horsepower. The motor 118 is controlled by a motor driven cam actuated timer 120 which commonly receives a 115-volt power supply from power supply lines L1 and L2. The bimetallic actuating element 90 has one of its terminals 98 connected by a conductor 121 to the timer 120 and its other terminal 98 connected by a conductor 122 to one of the power supply conductors 123 extending between timer and the motor 118. Actuation of the timer 120 is effective to connect the bimetallic actuating element 90 in series with the motor 118 or to shunt the element 90 so that the power supply from the lines L1 and L2 is supplied directly to the motor 118.

The fluid control valve shown in FIGS. 1–5 operates in the following manner. When there is no current flowing through the actuating element 90, the element remains in its normal generally flat condition as shown in FIG. 2. In this normally deenergized position, the outer end portion of the actuating lever 65 is urged upwardly by the force exerted by the compression spring 80. As a result of the spring-like characteristics of the bimetallic actuating element 90, the element 90 may also be positioned so that the tab 101 exerts an upward force on the actuating lever 65. These forces acting upwardly on the outer end portion of the lever 65 cause the inner end portion of the lever 65 to exert a force downwardly on the valve member 60 so that the tip portion 62 of the valve member positively closes the upper end of the bypass port 47. When the port 47 is closed, the water flow through the bleed holes 53 increases the water pressure on the top side of the diaphragm 45 so that the diaphragm 45 engages the valve seat 38 and stops the flow of water through the outlet passage 42.

When it is desired to open the valve, an electrical current is directed through the bimetallic actuating element 90 which causes heating of the element. The actuating element 90 may be connected in series with the motor 118 at the time the motor is energized so that the momentary higher starting current required by the motor 118 is effective to heat the bimetallic element 90 quickly. For example, in one construction of the valve, the bimetallic actuating element 90 had a resistance of approximately 0.8 ohms so that it did not significantly reduce the voltage across the motor 118 which had an approximately ½ horsepower rating. The starting current of the motor 118 caused the actuating element 90 to be heated immediately and to deform to its curved heated position (FIG. 3) in only a fraction of a second.

When the actuating element curves to its heated position, the upper edge defining the hole 102 within the tab 101 of the actuating element 90, presses downwardly on the outer end portion of the actuating lever 65. This downward movement effects pivoting of the lever 65 in a clockwise direction (FIG. 3) so that the inner end portion of the lever 65 produces a lifting force on the valve member 60 and elevates the valve member to its open position (FIG. 3). When the outer end portion of the lever 65 is urged downwardly by the bimetallic actuating element 90, the outer end or eye 69 of the lever 65 passes through a center plane defined by the effective pivot axis of the seal 72 and the axis of the spring retaining pin 82. This produces an over-center toggle action of the lever 65 so that the spring 80 also urges downwardly on the outer end portion of the lever 65 to maintain the valve member 60 in its fully opened position (FIG. 3).

When it is desired to close the valve after a predetermined quantity of water has been supplied to the tank 110, the timer deenergizes the bimetallic actuating element 90 by producing a shunt across the contacts or terminals 98. When the bimetallic actuating element 90 is deenergized, heat is dissipated into the surrounding air, and the element 90 slowly returns to its normal position as shown in FIG. 2. As the head portion 94 of the element 90 rises, the depending tab 101 elevates relative to the outer end portion of the lever 65. When the bottom edge of the hole 102 engages the outer end portion of the lever 65, the lever 65 commences to pivot counterclockwise (FIG. 3) as the head portion 94 of the actuating element 90 moves upwardly. When the outer end portion or eye 69 of the lever 65 passes back through the center-plane, the compression spring 80 immediately urges upwardly on the outer end portion of the lever 65 causing rapid movement of the valve member 60 downwardly to its closed position blocking the flow of water through the bypass 47 hole.

Since the vertical dimension of the hole 102 within the tab portion 101, is substantially greater than the diameter of the pin-like actuating lever 65, the lever 65 is free to pivot quickly in a counterclockwise direction when the eye 69 passes through the center plane to effect rapid closing of the valve member 60 against the diaphragm 45 which, in turn, effects rapid closing of the diaphragm 45 against the valve seat 38. This rapid closing of the valve is highly desirable in that it assures positive seating of the valve member 60 and the diaphragm 45 to avoid any leaking of water either through the bypass port 47 or around the valve seat 38.

Referring to FIGS. 7 and 8 which show a modified form of a pilot operated fluid control valve constructed in accordance with the invention, the valve body 125 is constructed substantially the same as the valve body 15 shown in FIG. 3 with the exception that the base section 126 includes a generally rectangular cup portion 128 which is molded as an integral part of the base section 126. The cup portion 128 includes an upwardly projecting frame-like side wall 129 which surrounds the closure section 55 and also the bimetallic actuating element 90. The cross pin 82 which retains the outer end portion of the compression spring 80, is snap-fitted into openings formed within a pair of parallel spaced ears or tabs 131 which are molded as an integral part of the cup portion 128.

Positioned above the valve body 125 is a vertical tube 135 which projects upwardly through the bottom wall of a dishwashing machine tank such as the tank 110 shown in FIG. 6. In the event that the motor driven timer 120 should fail to operate when the bimetallic actuating element 90 is energized, and the fluid control valve is in an open position, the continued supply of water to the tank would eventually begin to overflow through the tube 135 and would quickly fill the cup portion 128. When the overflow water contacts the bimetallic actuating element 90, which is still energized, heat is conducted from the element 90 at a rate faster than it is heated by resistance so that the actuating element 90 quickly cools and returns to its normal position as shown in FIG. 2. Thus the valve closes and the supply of water to the tank 110 stops. The water may be removed from the cup portion 128 by a removable plug (not shown).

The valve body also differs from the valve body 15 in that the valve body 125 includes a generally tubular inlet portion 141 having external threads 142. A tubular metal fitting 145 includes an internally threaded end portion 146 which engages the externally threaded inlet portion 141 of the valve body 125. The fitting 145 also includes a smaller diameter internally threaded tubular portion 148 which is integrally connected to the portion 146 by a radial flange portion 149. A resilient sealing ring or washer 152 is compressed between the flange portion 49 and the end of the tubular inlet portion 141 of the valve body 125 to form a fluid-tight seal between the valve body 125 and the fitting 145.

The fitting 145 also includes an outwardly projecting end flange portion 154 which has peripherally spaced teeth 156. The flange portion 154 and teeth 156 recess within a mating cavity 158 which is impressed within a heavy gauge sheet metal support bracket 160. A circular opening 162 is formed within the bracket 160 concentrically with the recess 158 and is adapted to receive the externally threaded end portion of a water supply line fitting (not shown) which is threaded into the tubular portion 148 of the fitting 145. The flange portion 154 and teeth 156 are secured within the cavity 158 by a pair of nuts 164 and corresponding screws 166 which extend through the bracket 160.

Referring to FIGS. 9–13 which show another embodiment of a pilot operated valve constructed in accordance with the present invention, a valve body 15' includes a base section 16' which is molded of a thermoplastics material and is constructed in substantially the same manner as the base section 16 of the embodiment shown in FIGS. 1–3. Accordingly, the same reference numbers but with the addition of a prime mark are used to identify the structure of the base section 16'. A flexible diaphragm 175 is constructed similar to the diaphragm 45 mentioned above, but includes a molded plastic insert hub 176 which has a center by-pass port 177 defined by an upwardly projecting frusto-conical seat portion 178 molded as an integral part of the hub portion 176. The hub portion 176 also defines a smaller bleed hole 181 and is partially encased by the rubber portion of the diaphragm 175.

In accordance with the present invention, the valve body 15' includes an upper closure section 185 which is also molded of a high temperature thermoplastics material or a thermo setting plastics material. The closure section 185 includes a substantially square base portion 186 which is secured to the base section 16' by a set of self-tapping screws 187. The closure section 185 confines the diaphragm 175 for movement within an inverted cup-shaped cavity or chamber 189. A cylindrical chamber 192 projects upwardly from the center of the chamber 189 and supports a cylindrical valve member 195 for axial or linear movement in the same manner as the valve member 60 is supported by the bore or chamber 58 referred to above in connection with FIGS. 3 and 4.

A circular recess is formed within the bottom end of the valve member 195 and retains a flat circular resilient rubber disc 197 for engagement with the seat portion 178 of the diaphragm 175. An hour-glass shaped hole 201 is formed within the upper portion of the valve member 195 and receives the inner end portion of a straight pin-like stainless steel lever 204 which is constructed the same as the lever 65 but without the eye portion 69. The lever 204 is pivotally supported by a flexible resilient seal 206 (FIG. 13), a thin metal washer 207 and a tubular nut 208 which is threaded into a counter-bored hole 209 within the closure section 185 of the valve body. The outer end portion of the lever 204 or the entire lever is preferably coated with an electrical insulating plastics material such as a tetrafluoroethylene resin.

The closure section 185 also includes an integrally molded flat wall portion 212 which is supported by a center rib portion 214. The wall portion 212 is rectangular and is slightly larger than a bimetallic actuating element 90' which is constructed substantially the same as the bimetallic actuating element 90' discussed above. The leg portions 92' of the actuating element 90' are secured to one end of the wall portion 212 by a pair of rivets 216. The actuating element 90' also includes a pair of terminal portions 98' and a depending tab portion 101' which has a hole 102' for receiving the outer end portion of the pin-like lever 204.

A pair of parallel spaced flange portions 220 are molded as an integral part of the closure section 185, and the outer surface of each flange portion 220 includes a vertical slot 221 which intersects a horizontal slot 222 to define a hole extending laterally through the flange portion 220 to receive the corresponding end portion of a cross-pin 224. A U-shaped leaf spring 225 is formed of a thin strip of sheet metal and has its outer end portion hooked over the cross-pin 224. The inner end portion of the spring 225 is bent into a slight V-shaped configuration and has a dimple for receiving the outer end surface of the lever 204. The leaf spring 225 functions in the same manner as the spring 80. That is, the spring 225 causes overcenter toggle action of the pin-like lever 204 in response to bending or curving of the bimetallic actuating element 90' when it is heated and cooled. The pivotal movement of the lever 204 produces movement of the valve member 195 between its open and closed positions. The slots 221 and 222 are provided to simplify molding of the aligned holes for receiving the cross-pin 224 which pivotally supports the leaf spring 225.

Another embodiment of the invention is shown in FIGS. 14 and 15. In this embodiment, the valve body includes a closure section 185' which is constructed similar to the closure section 185 but without the rib portion 214 and the flat top wall portion 212. The closure section 185' includes a pair of parallel spaced flanges 220' which have upper surfaces extending flush with a U-shaped shoulder surface 232 formed on the closure section 185'. A bimetallic actuating element 235 is constructed similar to the actuating elements 90 and 90' and includes generally parallel spaced leg portions 237 which are integrally connected by a head portion 238 to form an elongated U-shaped configuration. The leg portions 237 normally seat on the surface 232 and are secured to the closure section 185' by a pair of screws 239.

Spade-like terminals 241 project outwardly from the corresponding leg portions 237 for connecting the actuating element 235 as a resistance in series with a load as explained above in connection with FIG. 6. A U-shaped integral tab 244 depends downwardly from the head portion 238 of the bimetallic actuating element 235 and supports the outer end portion of a curved leaf spring 245 having a generally 6 configuration. The opposite or inner end portion of the leaf spring 245 has a slight bend and a dimple for receiving the outer end surface of the pin-like actuating lever 204'.

When the bimetallic actuating element 235 is deenergized (FIG. 14), the leaf spring 245 applies an upward force against the outer end portion of the lever 204' so that the valve member 195 is urged downwardly against the seat portion 178 of the diaphragm 175 and thereby maintains the valve in its normally closed position. When the bimetallic actuating element 235 is heated as a result of its resistance when an electrical current is conducted through the element, the element 235 curves upwardly (FIG. 15) which tends to compress the spring slightly. When the outer end portion of the leaf spring 245 passes through a plane containing the lever 204', the inner end portion of the spring 245 presses downwardly on the outer end portion of the lever 204' causing the valve to move by snap action to its open position (FIG. 15).

When the actuating element 235 is deenergized, it begins to cool and return to its generally flat normal position (FIG. 14). As the outer end portion of the spring 245 passes downwardly through the plane containing the lever 204', the inner end portion of the spring 245 presses upwardly on the outer end portion of the lever 204', thereby causing the valve member 195 to move by snap action to its closed position (FIG.

14). Thus the slow movement of the head portion 238 of the bimetallic actuating element 235 cooperates with the spring 245 to effect a toggle-like snap action of the lever 204' and thereby move the valve member 195 quickly between its upper open position and its lower closed position. This results in a rapid opening and closing of the pilot operated valve simply by providing a lag time in the program for energizing and deenergizing the actuating element 235.

From the drawing and the above description, it is apparent that a pilot operated fluid control valve constructed in accordance with the present invention, provides desirable features and advantages. For example, the construction of the fill valves shown in FIGS. 3, 11 and 14 significantly reduces the cost of producing an electrically controllable valve. In addition, the bimetallic actuating element eliminates the problem of magnetic attraction of ferrous particles within the water supply and thereby eliminates the resulting possibility of the valve member sticking.

Furthermore, the valve member 60 or 195 may be constructed of a plastics material which can further reduce the cost of the valve member and the deposit of lime on the valve member. The bimetallic actuating element 90 or 90' also positively actuates the valve and assures that the valve closes when the actuating element is deenergized.

The embodiment shown in FIGS. 9–13 provides additional advantages. As mentioned above, the wall portion 212 of the closure section 185 provides for protecting the bimetallic actuating element 90; during shipping and handling of the valve and also forms a fixed reference base support surface for the actuating element 90'. If desired, the top wall portion 212 may be provided with holes or notches to provide for increased thermal ventilation and more rapid cooling of the actuating element 90'. As another feature, the flange portions 220 of the closure section 185, provide for precisely positioning the leaf spring 225 in reference to the pin-like lever 204 and enable the valve member 195, lever 204, seal 206, actuating element 90' and spring 225 to be assembled as a sub-assembly prior to attaching the closure section 185 to the base section 16'.

The embodiment shown in FIGS. 14 and 15 provides an additional feature. That is, the construction and arrangement of the actuating element 235, the lever 204' and the spring 245 provide for snap action of the valve member 195 to its open position from its closed position in addition to snap actuation of the valve member 195 to its closed position in response to the slower movement of the head portion 238 of the actuating element 235. Similarly, the over-center actuation of the compression spring 80 or 225 cooperates with the small diameter lever 65 or 204 and the opening 102 or 102' within the actuating element 90 or 90' to provide for relatively quick closing of the valve member 60 in response to slower movement of the bimetallic actuating element. The small diameter actuating lever also minimizes the force required to retain the lever against the fluid pressure acting on the inner end surface of the lever and thereby provides for the use of the small flexible seal 72 or 206 to minimize the force required to pivot the lever. The diameter of the lever 65 or 204 should be less than ⅛ inch and preferably less than 1/16 inch.

Another important feature is provided by the cup portion 128 of the valve body 125. That is, the cup portion 128 cooperates with the overflow tube 135 to effect closing of the control valve in the event that the control timer 120 fails to advance after the resistance actuating element 90 is energized. As a result, this structure eliminates the need for a separate overflow float actuated or pressure actuated protector switch which is commonly wired in sereis with the solenoid of a conventional solenoid actuated valve. Another important feature is provided by the tubular fitting 145 which provides a rigid support for the fluid control valve and also assures that any torque applied to the fitting 145 is transferred directly to the main support bracket 160 instead of to the valve body 115. In addition, the teeth 156 provide for fine angular adjustment of the flow control valve relative to the support bracket 160.

While the forms of valve assemblies herein described constitute preferred embodiments of the invention, it is to be understood that the invention is not limited to these precise forms of valves, and that changes may be made therein without departing from the scope and spirit of the invention as defined in the appended claims.

The invention having thus been described, the following is claimed:

1. A pilot operated fluid control valve comprising a valve body including a base section and a closure section, said base section having an inlet and an outlet with a valve seat therebetween, a flexible diaphragm cooperating with said seat to control the flow of fluid from said inlet to said outlet and having means defining a bypass port, a movable valve member supported by said closure section for movement between an open position and a closed position relative to said port to control the movement of said diaphragm by differential pressure across said diaphragm, an elongated actuating lever, means including a flexible seal on said closure section of said valve body for supporting an intermediate portion of said lever for pivotal movement of said lever, means connecting the inner end portion of said lever to said valve member, a bimetallic actuating element supported entirely by said closure section of said valve body, means for heating said actuating element to effect movement of an actuating portion of said element between a normal position and a heated position, means for moving the outer end portion of said lever in response to movement of said actuating portion of said element between said normal and heated positions to effect movement of said valve member between said open and closed positions, said latter means including a spring connected to said lever and effective to cause relatively rapid movement of said lever and said valve member in response to slower movement of said actuating portion of said element, and said spring is supported entirely by said closure section of said valve body.

2. A valve as defined in claim 1 including means on said closure section of said valve body for forming a protective surface for said bimatallic actuating element in said normal position.

3. A valve member as defined in claim 2 wherein said closure section includes a substantially flat wall adjacent said actuating element to provide said protective surface.

4. A valve as defined in claim 1 wherein said spring extends between said lever and said actuating portion of said actuating element.

5. A valve as defined in claim 1 wherein said closure section includes means forming a pivotal support for a first portion of said spring, and said spring has a second portion pivotally connected to said outer end portion of said lever.

6. A valve as defined in claim 1 wherein said lever has a diameter less than 1/16 inch.

7. A valve as defined in claim 1 wherein said spring comprises a curved sheet metal leaf spring.

8. A valve as defined in claim 1 wherein said closure section of said valve body includes a set of generally parallel spaced flange portions, and said actuating portion of said actuating element projects between said flange portions when moving between said normal and heated positions.

9. A pilot operated fluid control valve comprising a valve body including a base section and a closure section, means for removably securing said closure section to said base section, said base section having an inlet and an outlet with a valve seat therebetween, a flexible diaphragm cooperating with said seat to control the flow of fluid from said inlet to said outlet and having means defining a bypass port, a valve member supported by said closure section for movement between an open position and a closed position relative to said port to control the movement of said diaphragm by differential pressure across said diaphragm, an elongated actuating lever, means including a flexible seal on said closure section of said valve body for supporting an intermediate portion of said lever for pivotal movement of said lever, means connecting the inner end portion of said lever to said valve member, an elongated bimetallic actuating element including a set of leg portions connected by a head portion, means for securing said leg portions to said closure section of said valve body, means for connecting said actuating element as a resistance within an electrical circuit to effect heating of said element and movement of said head portion between a normal position and a heated position, means for moving the outer end portion of said lever in response to movement of said head portion of said actuating element between said normal and heated positions to effect movement of said valve member between said open and closed positions, said latter means including a spring connected to said lever and effective to cause relatively rapid movement of said lever and said valve member in response to slower movement of said head portion of said actuating element, and said actuating element and said spring are adapted to be carried by said closure section when said closure section is removed from said base section of said valve body.

10. A pilot operated fluid control valve comprising a valve body including a base section and a closure section, means for removably securing said closure section to said base section, said base section having an inlet and an outlet with a valve seat therebetween, a flexible diaphragm cooperating with said seat to control the flow of fluid from said inlet to said outlet and having means defining a bypass port, a valve member supported by said closure section for generally linear movement on an axis between an open position and a closed position relative to said port to control the movement of said diaphragm by differential pressure across said diaphragm, an elongated actuating lever extending generally normal to said axis, means including a flexible seal on said closure section of said valve body for supporting an intermediate portion of said lever for pivotal movement of said lever, means connecting the inner end portion of said lever to said valve member, an elongated bimetallic actuating element supported by said closure section of said valve body and positioned generally normal to said axis of said valve member, means for heating said actuating element to effect movement of an actuating portion of said element between a normal position and a heated position, means for moving the outer end portion of said lever in response to movement of said actuating portion of said element between said normal and heated positions to effect movement of said valve member between said open and closed positions, said latter means including a spring connected to said lever and effective to cause relatively rapid movement of said lever and said valve member in response to slower movement of said actuating portion of said element, and said actuating element and said spring are adapted to be carried by said closure section when said closure section is removed from said base section of said valve body.

11. A valve as defined in claim 10 wherein said spring has one portion engaging said outer end portion of said lever and a second portion engaging said actuating portion of said actuating element.

12. A pilot operated fluid control valve comprising a valve body including a base section and a closure section, said base section having an inlet and an outlet with a valve seat therebetween, a flexible diaphragm cooperating with said seat to control the flow of fluid from said inlet to said outlet and having means defining a bypass port, a movable valve member supported by said closure section for movement between an open position and a closed position relative to said port to control the movement of said diaphragm by differential pressure across said diaphragm, an elongated actuating lever, means including a flexible seal on said closure section of said valve body for supporting an intermediate portion of said lever for pivotal movement of said lever, means connecting the inner end portion of said lever to said valve member, a bimetallic actuating element supported by said valve body, means for heating said actuating element to effect movement of an actuating portion of said element between a normal position and a heated position, means for moving the outer end portion of said lever in response to movement of said actuating portion of said element between said normal and heated positions to effect movement of said valve member between said open and closed positions, said latter means including a spring extending between said lever and said actuating portion of said element and effective to cause relatively rapid movement of said lever and said valve member in response to slower movement of said actuating element.

13. A pilot operated fluid control valve comprising a valve body including a base section and a closure section, means for securing said closure section to said base section, said base section having an inlet and an outlet with a valve seat therebetween, a flexible diaphragm cooperating with said seat to control the flow of fluid from said inlet to said outlet and having means defining a bypass port, a movable valve member supported by said closure section for movement between an open position and a closed position relative to said port to control the movement of said diaphragm by differential pressure across said diaphragm, a bimetallic actuating element supported by said closure section of said valve body, means for heating said actuating element to effect movement of an actuating portion of said element between a normal position and a heated position, means for moving said valve member between said open and closed positions in response to movement of said actuating portion of said element between said normal and heated positions, and said latter means having a spring actuation effective to cause snap-like movement of said valve member at least to said closed position.

* * * * *